US010923955B2

(12) United States Patent
Liu et al.

(10) Patent No.: US 10,923,955 B2
(45) Date of Patent: Feb. 16, 2021

(54) WIRELESS POWER SYSTEM WITH RESONANT CIRCUIT TUNING

(71) Applicant: Apple Inc., Cupertino, CA (US)

(72) Inventors: Nan Liu, Sunnyvale, CA (US); Rohan Dayal, Daly City, CA (US); Weihong Qiu, San Ramon, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 466 days.

(21) Appl. No.: 15/868,877

(22) Filed: Jan. 11, 2018

(65) Prior Publication Data

US 2019/0067978 A1 Feb. 28, 2019

Related U.S. Application Data

(60) Provisional application No. 62/551,720, filed on Aug. 29, 2017.

(51) Int. Cl.
*H02J 50/12* (2016.01)
*H02J 7/02* (2016.01)
(Continued)

(52) U.S. Cl.
CPC .............. *H02J 50/12* (2016.02); *H01F 38/14* (2013.01); *H02J 5/005* (2013.01); *H02J 7/025* (2013.01); *H02J 50/40* (2016.02)

(58) Field of Classification Search
CPC .. H02J 7/345; H02J 7/025; H02J 50/12; H02J 50/40; H02J 50/90; H02J 5/005
(Continued)

(56) References Cited

U.S. PATENT DOCUMENTS 8,667,452 B2 3/2014 Verghese et al.
9,209,627 B2 12/2015 Baarman et al.
(Continued)

FOREIGN PATENT DOCUMENTS

CN 104113144 A 10/2014
CN 104253462 A 12/2014
WO 2016126167 8/2016

OTHER PUBLICATIONS

Brubaker et al., System level considerations for integration of resonant capacitors in high power wireless charging, Conference on Eletric Roads and Vehicles (CERV), 2012, 11 pages.
(Continued)

*Primary Examiner* — Edward Tso
*Assistant Examiner* — Aaron Piggush
(74) *Attorney, Agent, or Firm* — Treyz Law Group, P.C.; Jason Tsai

(57) ABSTRACT

A wireless power system may use a wireless power transmitting device to transmit wireless power to a wireless power receiving device. The wireless power transmitting device may have an array of coils that extend under a wireless charging surface. Control circuitry may supply alternating-current control signals to inverters. The inverters are coupled to resonant circuits. Each resonant circuit includes a capacitor coupled to a respective one of the coils. During operation, wireless power signals are transmitted from the coils to the wireless power receiving device through the charging surface. The capacitor associated with each resonant circuit may potentially be individually selected to enhanced uniformity of the wireless power transmitting device. The array of coils may have multiple layers and the capacitors in each layer may have different respective values.

14 Claims, 9 Drawing Sheets

(51) Int. Cl.
  *H01F 38/14* (2006.01)
  *H02J 5/00* (2016.01)
  *H02J 50/40* (2016.01)
(58) Field of Classification Search
  USPC .................................. 320/108, 115, 140, 163
  See application file for complete search history.

(56) References Cited

U.S. PATENT DOCUMENTS

| | | |
|---|---|---|
| 9,496,746 B2 | 11/2016 | Mi et al. |
| 2010/0259217 A1* | 10/2010 | Baarman ................. H02J 50/40 320/108 |
| 2015/0236513 A1* | 8/2015 | Covic ..................... H02J 7/025 307/104 |
| 2015/0311725 A1* | 10/2015 | Yamamoto ............. G01V 3/101 307/104 |
| 2016/0005531 A1 | 1/2016 | Sullivan |
| 2016/0118806 A1 | 4/2016 | Standke et al. |
| 2016/0284465 A1 | 9/2016 | Maniktala |
| 2016/0285317 A1 | 9/2016 | Maniktala |
| 2016/0285319 A1 | 9/2016 | Maniktala |

OTHER PUBLICATIONS

The Qi Wireless Power Transfer System Power Class 0 Specification, Part 4: Reference Designs, Wireless Power Consortium, Apr. 2016, Version 1.2.2, 309 pages.
The Qi Wireless Power Transfer System Power Class 0 Specification, Part 3: Compliance Testing, Wireless Power Consortium, Apr. 2016, Version 1.2.2, 233 pages.
The Qi Wireless Power Transfer System Power Class 0 Specification, Parts 1 and 2: Interface Definitions, Wireless Power Consortium, Apr. 2016, Version 1.2.2, 160 pages.

* cited by examiner

WIRELESS POWER SYSTEM WITH RESONANT CIRCUIT TUNING

This application claims the benefit of provisional patent application No. 62/551,720, filed on Aug. 29, 2017, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a receiving coil and rectifier circuitry for receiving wireless alternating-current (AC) power from a coil in the wireless charging mat that is overlapped by the receiving coil. The rectifier converts the received AC power into direct-current (DC) power.

SUMMARY

A wireless power system may use a wireless power transmitting device to transmit wireless power to a wireless power receiving device. The wireless power transmitting device may have an array of coils under a wireless charging surface. Control circuitry may supply alternating-current control signals to inverters. The inverters are connected to resonant circuits. Each resonant circuit includes a capacitor connected to a respective one of the coils. During operation, wireless power signals are transmitted from the coils to the wireless power receiving device through the charging surface.

The capacitor associated with each resonant circuit may be individually selected to enhanced uniformity of the wireless power transmitting device or layers of the coils may have capacitors of different respective values. The coils in the array may all have the same shape. The coils in a layer may overlap one or more coils in other layers.

DETAILED DESCRIPTION

A wireless power system has a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device has an array of wireless power transmitting coils arranged in multiple layers under a charging surface. During operation, the wireless power transmitting coils are used to transmit wireless power signals that are received by a wireless power receiving coil in the wireless power receiving device. Each wireless power transmitting coil may be connected to a respective capacitor in a resonant circuit. The inductances of the wireless power transmitting coils may vary as a function of position within the mat and distance from the wireless power receiving device. This can lead to potential variations in the resonant circuit behavior of the resonant circuits. By characterizing coil behavior with test equipment, capacitor values may be chosen for the resonant circuits that ensure uniform wireless charging performance across the charging surface.

Figure 1:
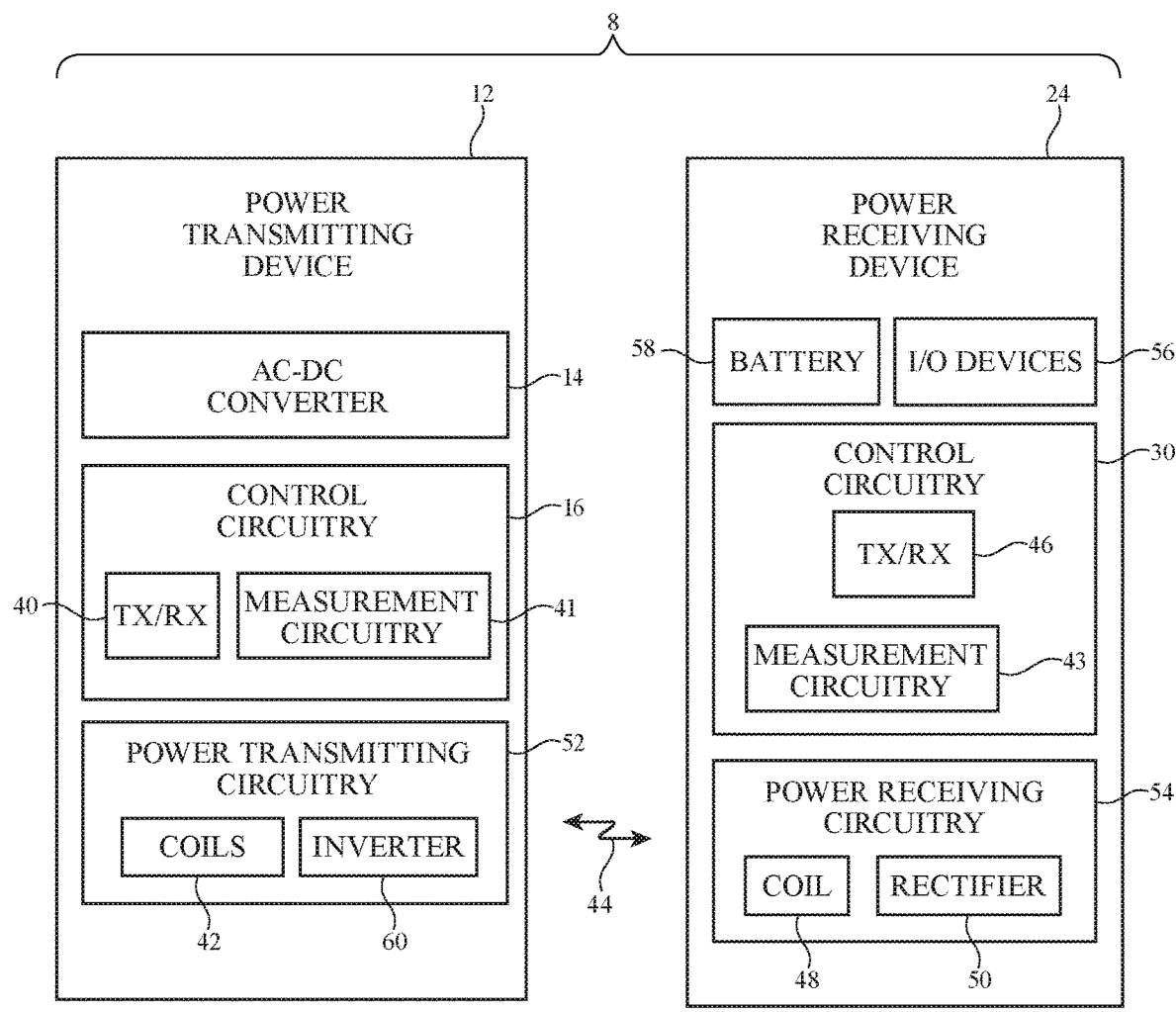
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry includes processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in determining power transmission levels, processing sensor data, processing user input, handling communications between devices 12 and 24 (e.g., sending and receiving in-band and out-of-band data), selecting wireless power transmitting coils, and otherwise controlling the operation of system 8.

Control circuitry in system 8 may be used to authorize components to use power and ensure that components do not exceed maximum allowable power consumption levels. Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is connected to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat may sometimes be described herein as an example.

Power receiving device 24 may be a portable electronic device such as a wristwatch, a cellular telephone, a laptop computer, a tablet computer, or other electronic equipment. Power transmitting device 12 may be connected to a wall outlet (e.g., alternating current), may have a battery for supplying power, and/or may have another source of power. Power transmitting device 12 may have an AC-DC power converter such as power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more coils 42. Coils 42 may be arranged in a planar coil array (e.g., in configurations in which device 12 is a wireless charging mat).

As AC currents pass through one or more coils 42, alternating-current electromagnetic fields (signals 44) are produced that are received by one or more corresponding coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering a battery such as battery 58 and can be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 uses one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power is conveyed wirelessly from device 12 to device 24 during these FSK and ASK transmissions.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, less than 500 kHz, less than 300 kHz, 50-200 kHz, or other suitable wireless power frequency. In some configurations, the power transmission frequency may be negotiated in communications between devices 12 and 24. In other configurations, the power transmission frequency is fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In-band communications between device 24 and device 12 uses ASK modulation and demodulation techniques. Wireless transceiver circuitry 46 transmits in-band data to device 12 by using a switch (e.g., one or more transistors in transceiver 46 that are connected to coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. Control circuitry 30 has measurement circuitry 43. Measurement circuitry 41 and 43 may be used in making inductance measurements (e.g., measurements of the inductances of coils 42 and 48), input and output voltage measurements (e.g., a rectifier output voltage, and inverter input voltage, etc.), current measurements, capacitance measurements, and/or other measurements on the circuitry of system 8.

Figure 2:
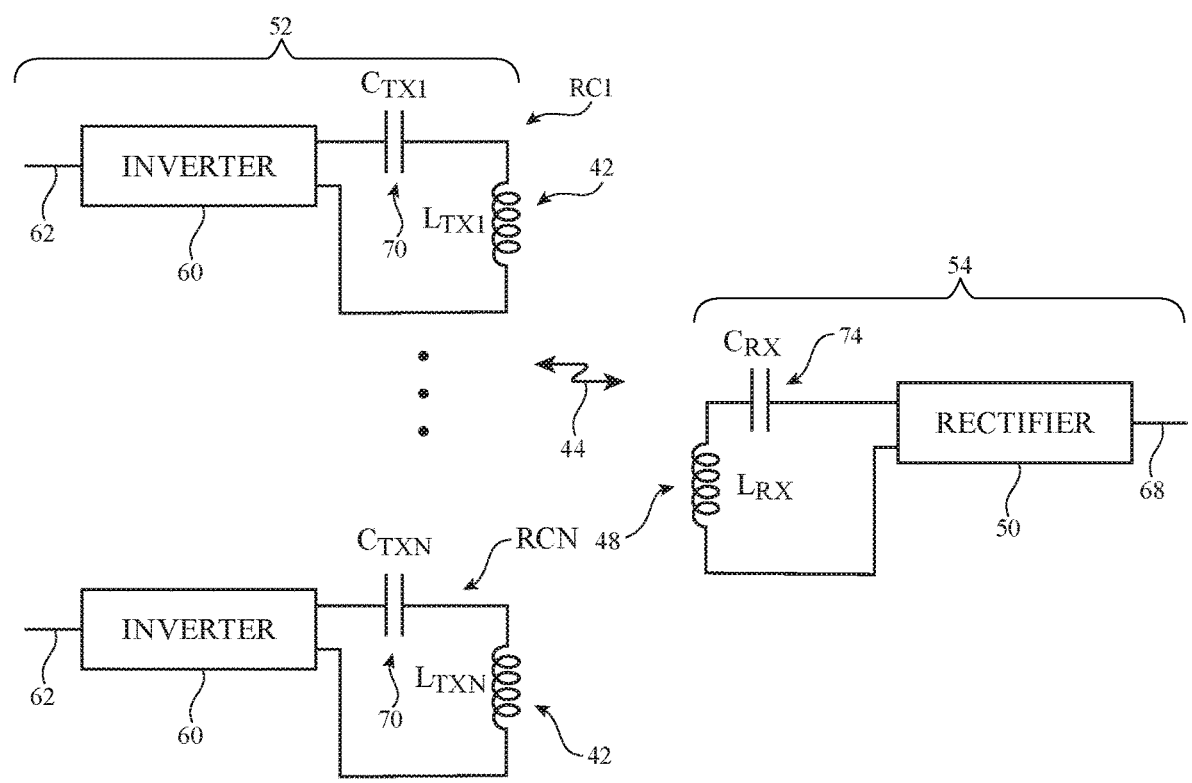
FIG. 2 is a circuit diagram of illustrative wireless power transmitting circuitry and illustrative wireless power receiving circuitry in accordance with an embodiment.

Illustrative circuitry of the type that may be used for forming power transmitting circuitry 52 and power receiving circuitry 54 of FIG. 1 is shown in FIG. 2.

As shown in FIG. 2, power transmitting circuitry 52 may include drive circuitry such as inverters 60 coupled to respective resonant circuits RC1 . . . RCN. Each resonant circuit may include a wireless power transmitting coil 42 and capacitor 70. In resonant circuits RC1 . . . RCN, coils 42 may have respective inductances Ltx1 . . . Ltxn and capacitors 70 may have respective capacitances Ctx1 . . . Ctxn. Coils 42 may all have a common shape, but the values of Ltx1 . . . Ltxn may differ due to differing distances to coil 48 of device 24.

Inverters 60 have metal-oxide-semiconductor transistors or other suitable transistors that are modulated by AC control signals from control circuitry 16 (FIG. 1) that are received on respective control signal inputs 62. The attributes of each AC control signal (e.g., duty cycle, etc.) may be adjusted dynamically during power transmission to control the amount of power being transmitted by power transmitting coils 42.

When transmitting wireless power, control circuitry 16 (FIG. 1) selects one or more appropriate coils 42 to use in transmitting signals 44 to coil 48 (e.g., control circuitry 16 supplies control signals to the inputs 62 of the inverters 60 connected to the selected coils to produce signals 44). Coil 48 and capacitor 74 (of capacitance Crx) form a resonant circuit in circuitry 54 that receives signals 44. Receiver 50 rectifies the received signals and provides direct-current output power at output 68.

Figure 3:
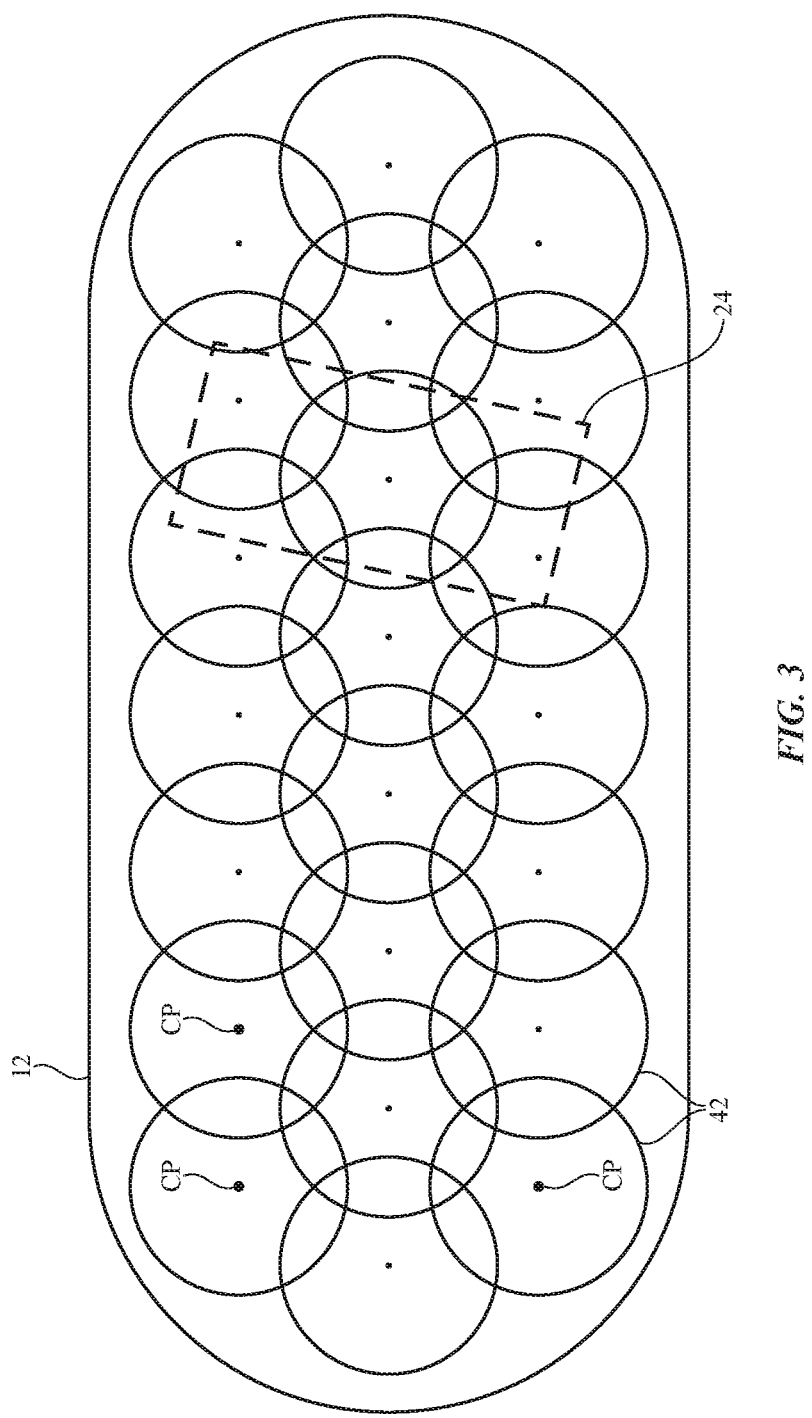
FIG. 3 is a top view of an illustrative wireless power transmitting device on which a wireless power receiving device has been placed in accordance with an embodiment.

A top view of an illustrative configuration for device 12 in which device 12 has an array of coils 42 is shown in FIG. 3. Device 12 may, in general, have any suitable number of coils 42 (e.g., 22 coils, at least 5 coils, at least 10 coils, at least 15 coils, fewer than 30 coils, fewer than 50 coils, etc.). Coils 42 may be arranged in rows and columns and may or may not partially overlap each other. Device 12 may have a planar housing surface that covers coils 42 (sometimes referred to as a charging surface). One or more wireless power receiving devices such as device 24 may be positioned on the charging surface as shown in FIG. 3 to receive wireless power from coils 42. Coils 42 may be circular or may have other suitable shapes (e.g., coils 42 may be square, may have hexagonal shapes, may have other shapes having rotational symmetry, etc.). In the illustrative configuration of FIG. 3, coils 42 are circular and are formed from multiple wire turns (e.g., multiple turns formed from metal traces, bare wire, insulated wire, wire monofilaments, multifilament wire, etc.) surrounding respective coil centers CP.

Figure 4:
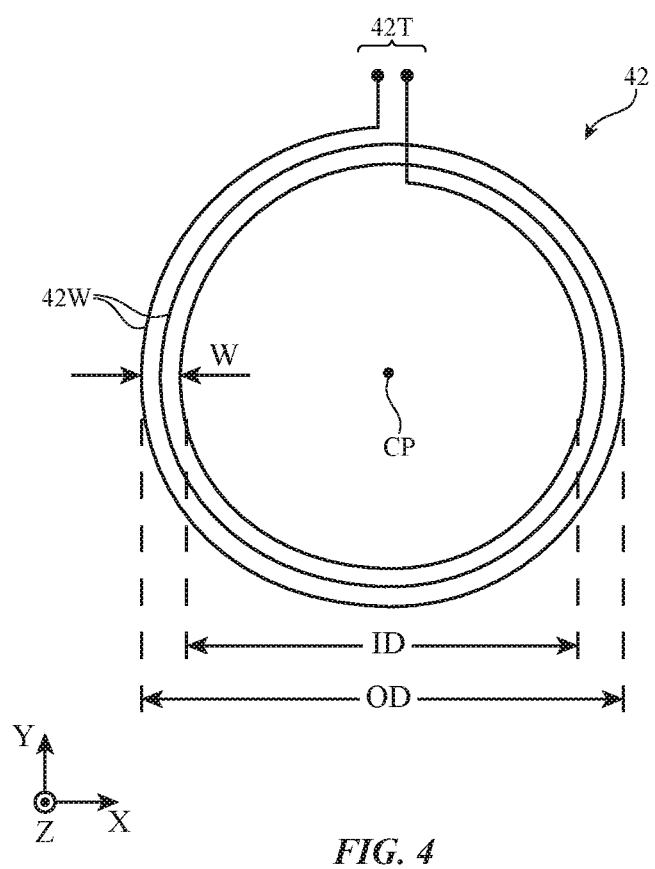
FIG. 4 is a top view of an illustrative wireless power transmitting coil in accordance with an embodiment.

To enhance spatial freedom, the wireless power transmitting coils of device 12 may be identical or nearly identical to each other (e.g., coils 42 may all have a common shape). For example, each of coils 42 may have a configuration of the type shown in FIG. 4. As shown in FIG. 4, each coil 42 may be characterized by a number of circular turns (wire loops) of wire 42W about coil center 42 (e.g., 10-200, less than 300, less than 100, at least 5, at least 25, or other suitable number of turns). The number of turn of wire in each of coils 42 in device 12 may be identical or may vary by less than 10% between coils, less than 5% between coils, less than 2% between coils, etc. (as examples). Coils 42 may also all share a common inner diameter ID (e.g., the value of inner diameter ID may exhibit a coil-to-coil variation of less than 5%, less than 2%, or other suitable value) and/or may all share a common outer diameter OD (e.g., outer diameter OD may exhibit a coil-to-coil variation of less than 5%, less than 2%, or other suitable amount). Each coil 42 may have terminals 42T and, to enhance manufacturability, each pair of terminals 42T or at least some of these pairs of terminals may be located with the same angular orientation (angle) relative to coil center CP (e.g., the 12:00 position in the example of FIG. 4). Coils 42 that have the same number of turns, inner diameter, outer diameter, terminal location, etc. (e.g., coils 42 that have the same shape) may be organized in multiple layers and may include coils that overlap each other (e.g., coils in one layer that overlap coils in one or more other layers).

Figure 5A:
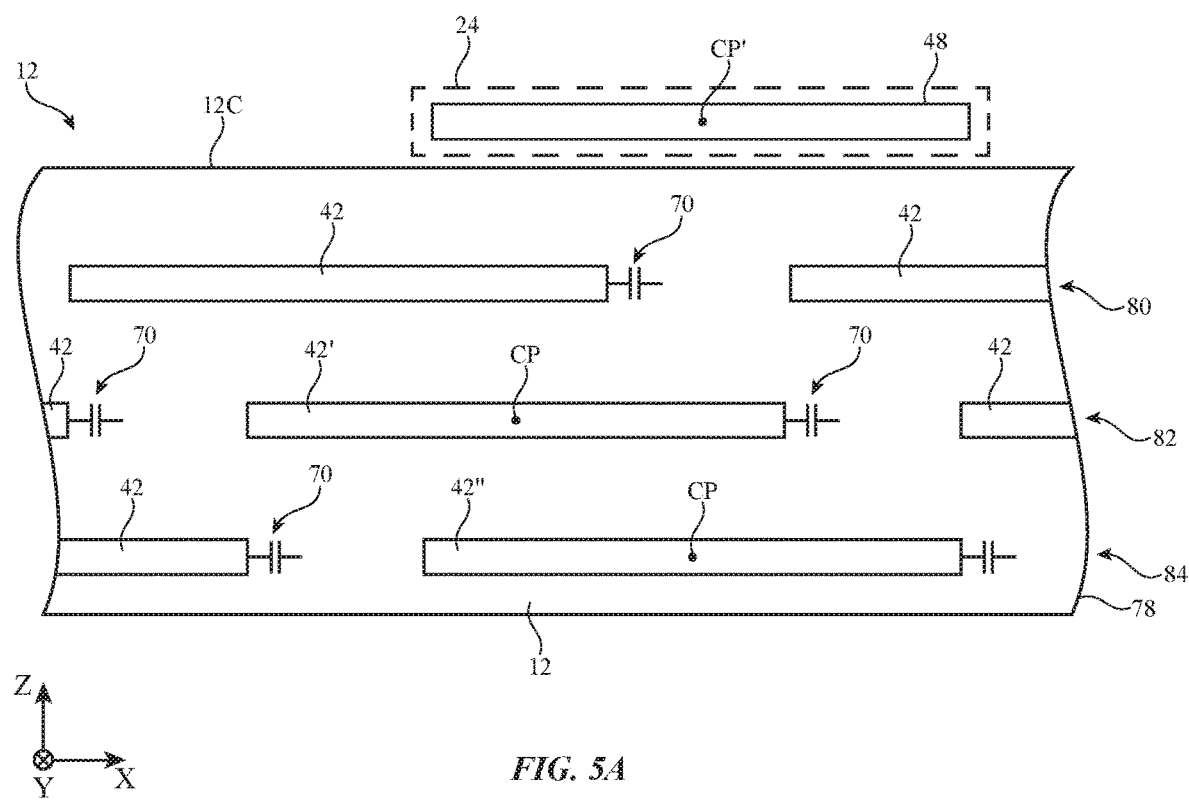
FIG. 5A is a cross-sectional side view of an illustrative wireless power transmitting device with multiple layers of wireless power transmitting coils in accordance with an embodiment.

As shown in FIG. 5A, device 12 may have a housing 78 (e.g., a housing formed from plastic or other materials with a planar upper surface such as charging surface 12C) that encloses multiple layers of coils 42. In the illustrative example of FIG. 5A, device 12 has three layers of coils 42: first (upper) layer 80, second (middle) layer 82, and third (lower) layer 84. Middle layer 82 may include coils such as illustrative middle layer coil 42'. Lower layer 84 may include coils such as illustrative lower layer coil 42". Despite being constructed identically, the inductances of coils 42 may vary depending on their location within device 12 (e.g., due to different distances between each coil 42 and coil 48 when coil 48 is aligned with that coil). As a result, a coil in middle layer 82 such as coil 42' will exhibit a peak inductance value (when the center CP of coil 42' is aligned with center CP' of coil 48) that is less than the peak inductance value exhibited when coil 48 is aligned with a coil 42 in upper layer 80. Unless care is taken, the differing inductance values for the coils will cause the different resonant circuits RC1 . . . RCN of wireless power transmitting circuitry 52 to perform differently and the performance of device 12 will not be uniform across charging surface 12C.

FIGS. 5B, 5C, 5D, and 5E are diagrams of an illustrative wireless power transmitting device such as a charging mat having 22 coils in three layers.

Figure 5B:
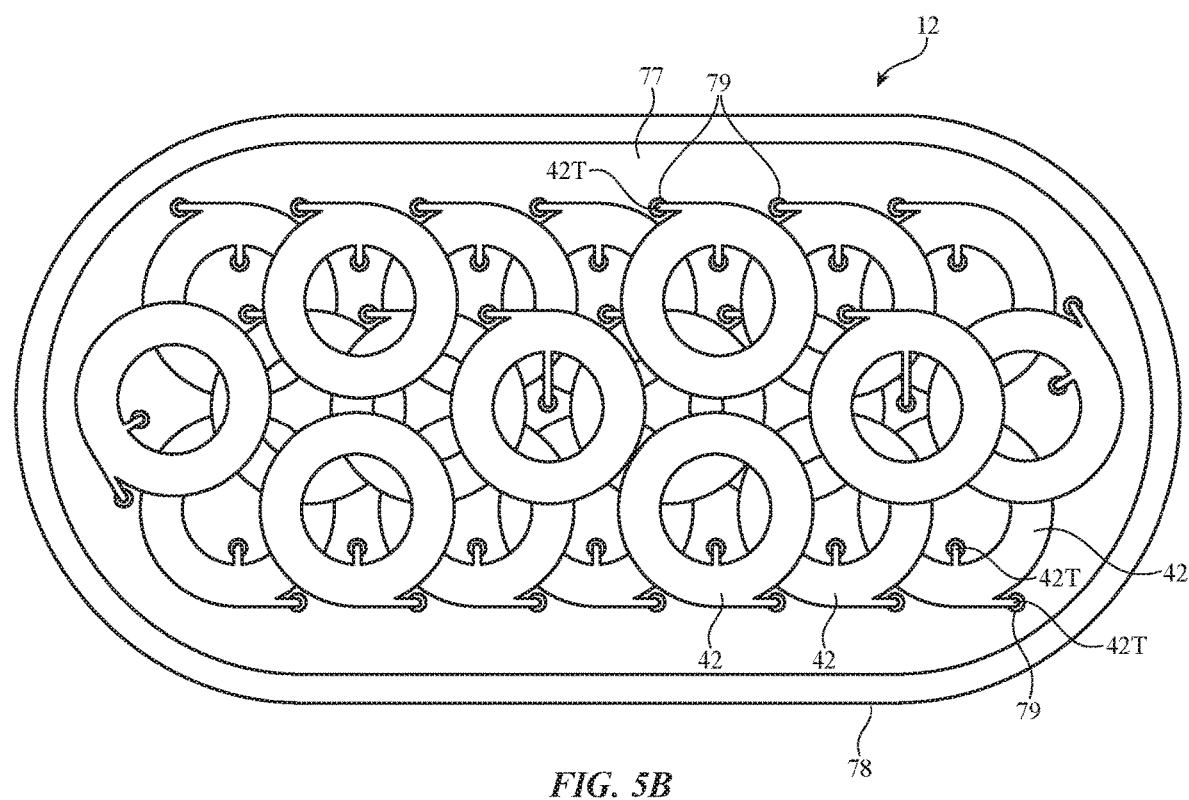
FIG. 5B is a top view of an illustrative wireless power transmitting device with an array of 22 coils in three layers in accordance with an embodiment.

FIG. 5B is a top view of wireless power transmitting device 12 in an illustrative configuration in which there are 22 coils 42 (mounted above printed circuit board 77, which has openings 79 to accommodate terminal wires in terminals 42T) that partially overlap each other and that are arranged in three different layers.

Figure 5C:
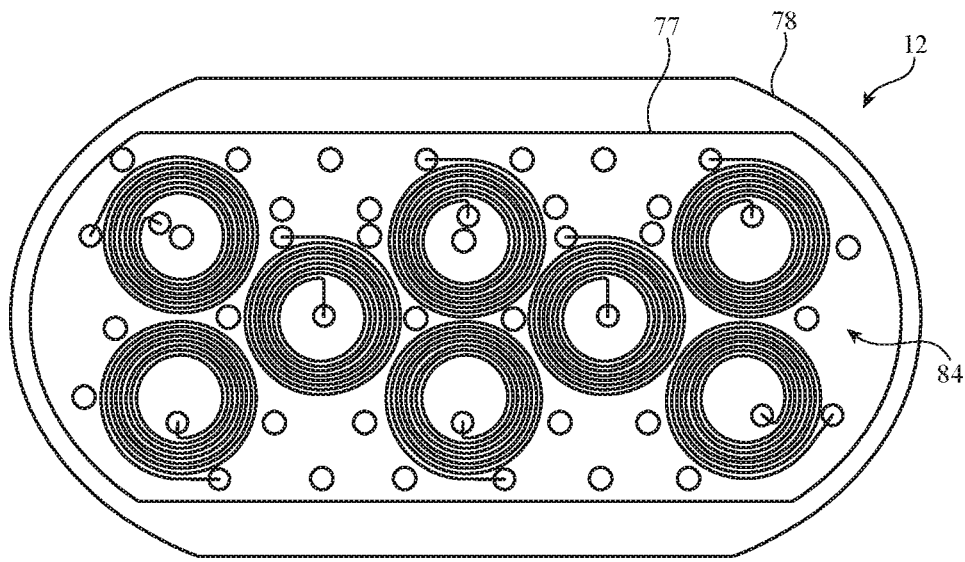
FIG. 5C is a top view of an illustrative lower layer of eight coils for the wireless power transmitting device of FIG. 5B in accordance with an embodiment.
Figure 5D:
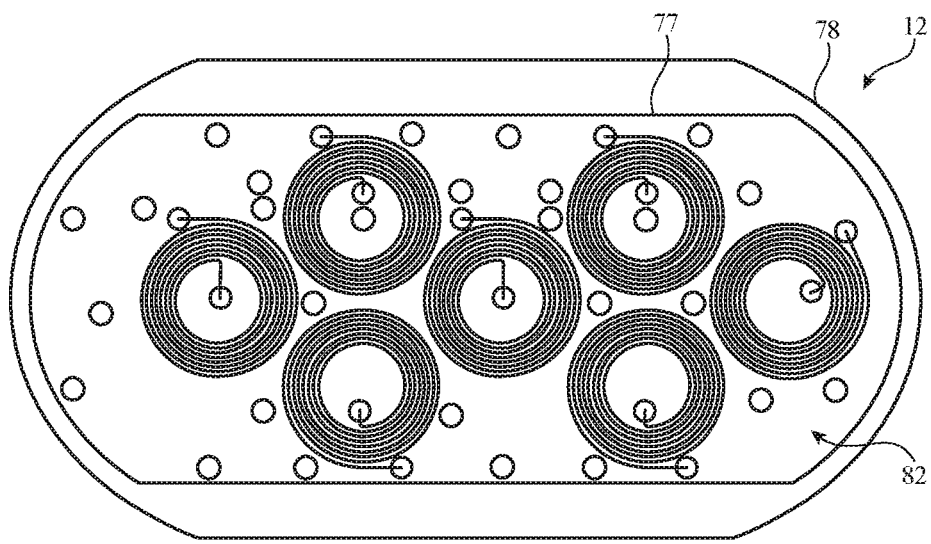
FIG. 5D is a top view of an illustrative middle layer of seven coils for the wireless power transmitting device of FIG. 5B in accordance with an embodiment.
Figure 5E:
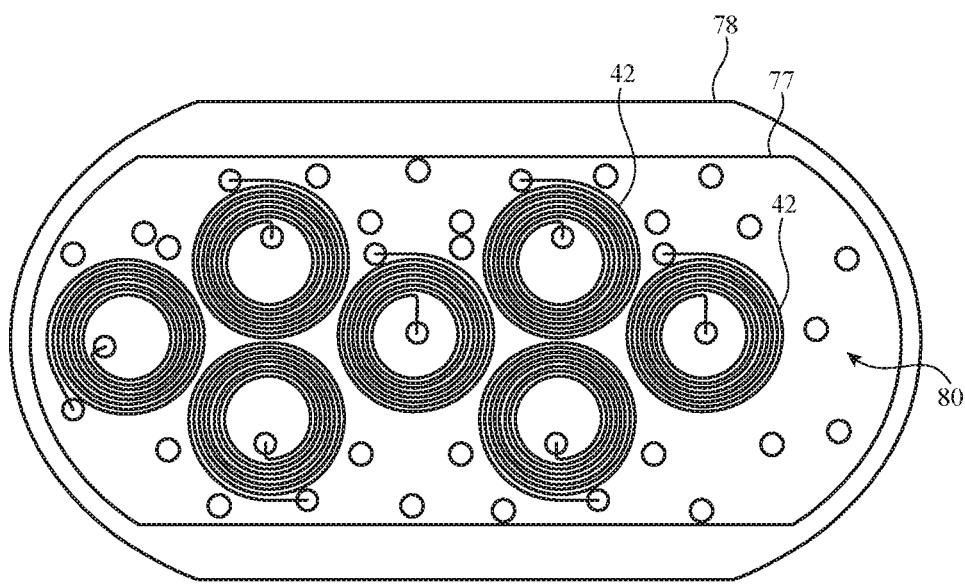
FIG. 5E is a top view of an illustrative upper layer of seven coils for the wireless power transmitting device of FIG. 5B in accordance with an embodiment.

FIG. 5C is a top view of an illustrative configuration for lower layer 84 having eight coils 42 in wireless power transmitting device 12 of FIG. 5B. FIG. 5D is a top view of an illustrative configuration for middle layer 82 having seven coils 42 for wireless power transmitting device 12 of FIG. 5B. FIG. 5E is a top view of an illustrative configuration for upper layer 80 having seven coils for wireless power transmitting device 12 of FIG. 5B. In this example, lower layer 84 has 8 coils, middle layer 82 has 7 coils, and upper layer 80 has 7 coils. In general, each layer may have any suitable number of coils (e.g., at least 2 coils, at least 5 coils, fewer than 9 coils, fewer than 14 coils, 6-9 coils, etc.). Device 12 may have one layer of coils 42, at least two layers of coils 42, at least three layers of coils 42, at least four layers of coils 42, fewer than five layers of coils 42, 4-6 layers of coils, etc.

To enhance uniformity, capacitors 70 or at least the set of capacitors in each layer of coils 42 may each have a different respective value (e.g., these capacitors may have different rated capacitor values, not just incidentally different values arising from the normal manufacturing variations associated with capacitors having the same rated value). During manufacturing, satisfactory values for capacitance Ctx in each resonant circuit may be established using equipment of the type shown in FIG. 6. In the illustrative system of FIG. 6 (e.g., a test system used during manufacturing characterization of wireless power transmission), test equipment 90 has probes connected to coil 42 and coil 48. Coil 42 may form part of device 12 (e.g., a representative test device or other representative hardware) and may be connected to inverter 60 and capacitor Ctx in wireless power transmitting circuitry 52 of device 12. Coil 48 may form part of device 24 (e.g., a representative test device or other representative hardware) and may be connected to rectifier 50 and capacitor Crx.

During characterization measurements, test equipment 90 may apply voltage Vin to the input of inverter 60 and measure the resulting direct-current output Vo of rectifier 50. Test equipment 90 may also make additional measurements (e.g., measurements of the inductance of coil 42, the inductance of coil 48, etc.) and can use these measurements to determine magnetic coupling coefficient k.

The location of coil 48 may be adjusted while measuring k and other parameters in this way with test equipment 90. In particular, coil 48 may be placed in various lateral locations across charging surface 12C (e.g., various locations in the X-Y plane of FIG. 5A) while measuring coupling coefficient k. The value of k can be maximized by aligning coil 48 with a coil of interest such as illustrative coil 42' in FIG. 5A. After placing coil 48 in a known coupling coefficient relationship with coil 42 (e.g., by maximizing k or by achieving another desired known k value), test equipment 90 can characterize the performance of wireless power transmitting circuitry 52 and wireless power receiving circuitry 54 (e.g., by measuring Vo, the inductance of coil 42, and the inductance of coil 48). The value of Vin that is applied to the inverter 60 that is connected to coil 42 is known by test equipment 90. Using this information, equation 1 or equation 2 may be used to determine a satisfactory capacitance value (Ctx) to use for the capacitor 70 that is coupled to the coil 42 that is being characterized (or to use for the capacitors 70 coupled to all of the coils in the same layer as coil 42).

$$\omega_o = 1/(LtxCtx)^{1/2} \quad (1)$$

$$Vo \approx \omega k(Lrx)^{1/2} Vin/[\omega(Ltx)^{1/2} - (1/\omega Ctx(Ltx)^{1/2})] \quad (2)$$

In equation 1, $\omega_o$ is the resonant frequency of the resonant circuit (set at 60-70% of the wireless power transfer frequency, which is the frequency of the AC drive signals supplied to the inverter circuitry of wireless power transmitting circuitry 52) and Ltx is the inductance of coil 42 that is measured at the peak-k (or other known k) location of coil 48. When using equation 1 to determine Ctx for each coil 42 (or at least each different layer of coils 42), Ctx values are selected based on achieving the same resonant frequency for each coil.

In equation 2, Vo is the measured output voltage from rectifier 50, k is the peak-k value (or other known k value) associated with coil 42 and coil 48, Lrx is the measured inductance (at peak k or other known k) of coil 48, Ltx is the measured inductance of coil 42, and Vin is the known direct-current voltage value of the input voltage to inverter 60. When using equation 2 to determine the values of Ctx for device 12, Ctx values are chosen for each coil 42 (or layers of coils 42) so that use of each coil 42 produces the same open-circuit output voltage Vo at the output of rectifier 50.

There is often metal present in device 24 that overlaps coils 42, leading to a parasitic resistance in the resonant circuit (LC circuit) in circuitry 52. During operation of device 12 (e.g., when estimating coupling coefficient k for each coil 42 to aid in coil selection), the parasitic resistance can be a source of inaccuracy. In configurations for device 12 in which the values of Ctx are chosen using an equation such as equation 1 or equation 2 (e.g., if Ctx is tuned separately for each associated coil 42 or each layer of coils 42), the magnitude of the parasitic resistance is reduced and accuracy in the estimation of coupling coefficient k by device 12 is enhanced. Individual (coil-specific) or layer-specific capacitor tuning also helps enhance the uniformity of the wireless power signal output of device 12 across charging surface 12C.

Figure 6:
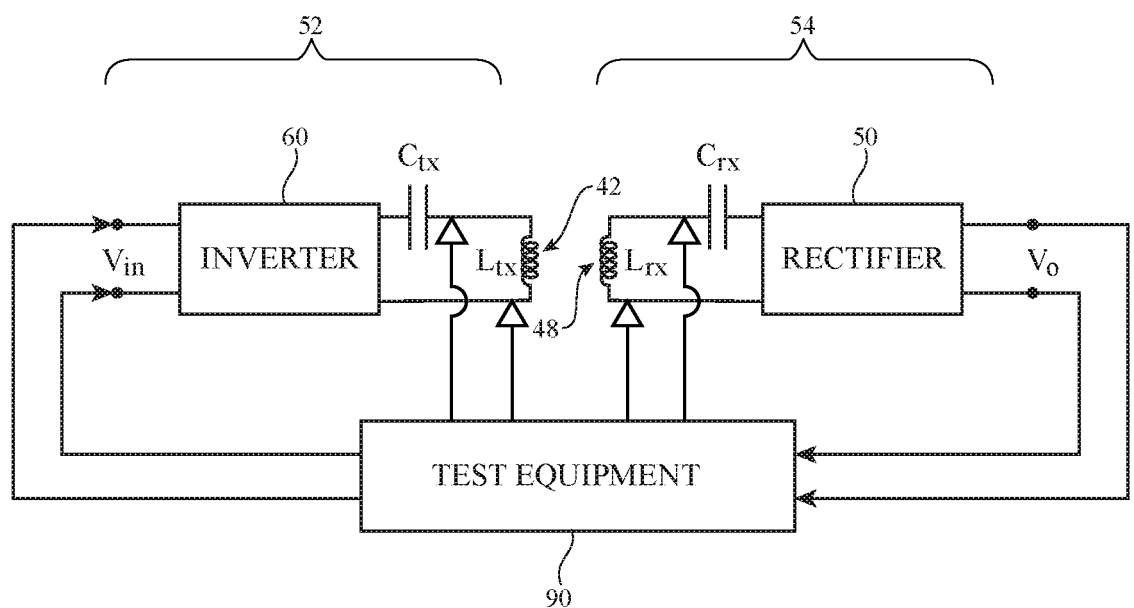
FIG. 6 is a diagram of illustrative test equipment for characterizing wireless power circuitry in accordance with an embodiment.
Figure 7:
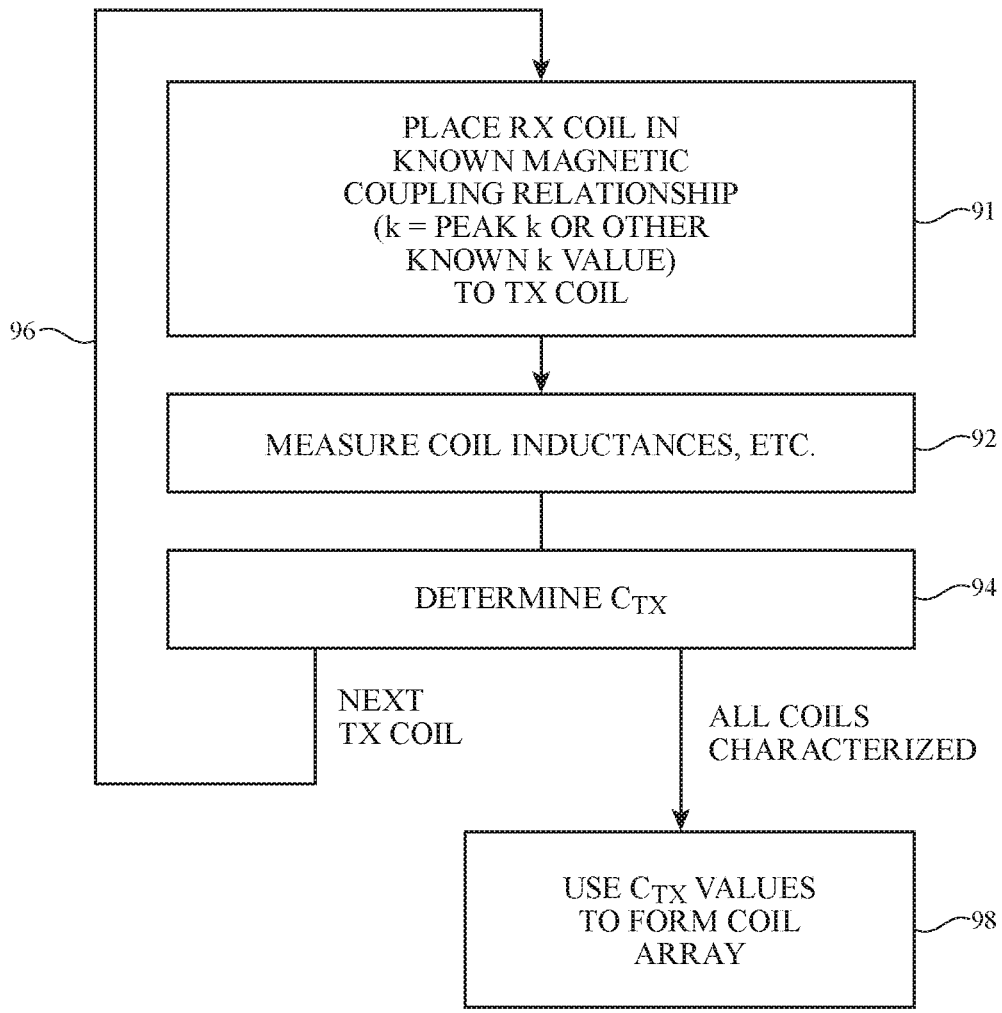
FIG. 7 is a flow chart of illustrative operations involved in selecting capacitor values for resonant circuits in a wireless power transmitting device in accordance with an embodiment.

FIG. 7 is a flow chart of illustrative operations involved in using test equipment 90 of FIG. 6 to ensure that device 12 is manufactured with satisfactory capacitor values for capacitors 70 in resonant circuits RC1 . . . RCN of wireless power transmitting circuitry 52.

During the operations of block 91, a device 24 (or representative hardware) containing coil 48 is positioned on charging surface 12C of device 12 so that coil 48 is placed in a known magnetic coupling relationship with a given one of coils 42 in device 12 (or representative hardware with an array of coils 42). With one illustrative scenario, coil 48 is moved in the X-Y plane of charging surface 12C until coil 48 and given coil under test (e.g., coil 42' in the example of FIG. 5A) exhibit a peak value of coupling coefficient k (e.g., when coil center CP' of coil 48 is aligned with coil center CP of coil 42'). With another illustrative scenario, coil 48 is moved into a position in which coil 48 and coil 42 exhibit a predetermined value of coupling coefficient k (e.g., k=0.7).

During the operations of block 92, test equipment 90 gathers inductance measurements (e.g., Ltx and Lrx) and gathers a measurement of Vo from device 24. This information and information on the known AC drive frequency and known input voltage Vin may be used during the operations of block 94 (e.g., with equation 1 or equation 2) to determine a value of Ctx to use in the resonant circuit associated with the given coil 42.

After the current coil under test has been characterized and a corresponding value of Ctx identified, additional coils 42 can be characterized in the same way, as indicated by line 96. Once all desired coils 42 have been characterized and corresponding capacitor values Ctx1 . . . Ctxn have been determined, devices 12 can be manufactured in which resonant circuits RC1 . . . RCN incorporate capacitors 70 of respective capacitances Ctx1 . . . Ctxn (e.g., devices 12 can be formed during the operations of block 98). Individual capacitance values can be used in each resonant circuit, or all resonant circuits in each coil layer of a multilayer coil array can be provided with respective capacitance values selected based on equations 1 or 2. For example, in a three-layer coil array (see, e.g., layers 80, 82, and 84), respective first, second, and third capacitor values can be chosen for the capacitors 70 respectively in the first, second, and third layers. Within each layer, the capacitor value that is used may, for example, be an average value of the individual capacitor values produced using equation 1 or equation 2 for the resonant circuits in that layer.

The foregoing is merely illustrative and various modifications can be made to the described embodiments. The foregoing embodiments may be implemented individually or in any combination.

What is claimed is:

1. A wireless power transmitting device configured to transmit wireless power to a wireless power receiving device through a charging surface, comprising:
    a plurality of wireless power transmitting coils of a common shape;
    a capacitor coupled to each of the wireless power transmitting coils to form respective resonant circuits;
    inverter circuitry coupled to the resonant circuits; and
    control circuitry configured to use the inverter circuitry to transmit wireless power signals with at least one of the wireless power transmitting coils, wherein:
        the wireless power transmitting coils are arranged in a plurality of layers under the charging surface, and
        the capacitors coupled to wireless power transmitting coils in different layers have different capacitances configured to produce a same open-circuit voltage at a rectifier output within the wireless power receiving device.

2. The wireless power transmitting device of claim 1 wherein each of the wireless power transmitting coils has the same number of turns.

3. The wireless power transmitting device of claim 2 wherein each of the wireless power transmitting coils has rotational symmetry.

4. The wireless power transmitting device of claim 3 wherein the wireless power transmitting coils are circular or square.

5. The wireless power transmitting device of claim 1 wherein at least two layers in the plurality of layers have a different number of wireless power transmitting coils.

6. The wireless power transmitting device of claim 1 wherein the layers include first, second, and third layers and wherein the capacitors comprise:
    first capacitors of a first value coupled respectively to the wireless power transmitting coils of the first layer;
    second capacitors of a second value that is different than the first value coupled respectively to the wireless power transmitting coils of the second layer; and
    third capacitors of a third value that is different than the first and second values coupled respectively to the wireless power transmitting coils of the third layer.

7. The wireless power transmitting device of claim 6 wherein each wireless power transmitting coil of the plurality of wireless power transmitting coils is positioned in one and only one layer of the plurality of layers of wireless power transmitting coils.

8. The wireless power transmitting device of claim 6 wherein each of the coils has an outer diameter and wherein the outer diameters of the coils are equal.

9. The wireless power transmitting device of claim 8 wherein each of the coils has an inner diameter and wherein the inner diameters of the coils are equal.

10. The wireless power transmitting device of claim 9 wherein each of the wireless power transmitting coils has terminals located at a given angle with respect to a center of that wireless power transmitting coil and wherein the given angle is equal for at least some of the wireless power transmitting coils.

11. A wireless charging mat having a charging surface, wherein the wireless charging mat is configured to transmit wireless power to a wireless power receiving device through the charging surface, the wireless charging mat comprising:
    wireless power transmitting coils of a common shape;
    capacitors coupled to the wireless power transmitting coils to form respective resonant circuits, wherein each capacitor has a different value individually optimized for magnetic coupling with a power receiving coil in the wireless power receiving device;
    inverter circuits coupled respectively to the resonant circuits; and
    control circuitry configured to use at least one of the inverter circuits and the resonant circuit coupled to that inverter circuit to transmit the wireless power.

12. The wireless charging mat of claim 11 wherein the wireless power transmitting coils are arranged in at least first and second layers and wherein at least one of the wireless power transmitting coils in the first layer overlaps at least one of the wireless power transmitting coils in the second layer.

13. The wireless charging mat of claim 11 wherein each of the coils has an outer diameter and wherein the outer diameters of the coils are within 5% of each other.

14. The wireless charging mat of claim 11 wherein each of the coils has an inner diameter and wherein the inner diameters of the coils are within 5% of each other.

* * * * *